United States Patent [19]

Lühmann et al.

[11] Patent Number: 5,491,012
[45] Date of Patent: Feb. 13, 1996

[54] USE OF A STRIP OF AN ADHESIVE FILM FOR A RE-RELEASABLE ADHESIVE BOND

[75] Inventors: Bernd Lühmann, Norderstedt; Andreas Junghans, Hamburg, both of Germany

[73] Assignee: Beiersdorf Aktiengesellschaft, Hamburg, Germany

[21] Appl. No.: 87,622

[22] Filed: Jul. 1, 1993

[30] Foreign Application Priority Data

Jul. 11, 1992 [DE] Germany .......................... 42 22 849.2

[51] Int. Cl.⁶ ...................................................... C09J 7/02
[52] U.S. Cl. ................................. 428/40; 206/411; 428/41; 428/42; 428/192; 428/194; 428/214; 428/323; 428/346; 428/347; 428/349; 428/354; 428/355
[58] Field of Search .................................. 428/40, 42, 41, 428/192, 194, 214, 323, 343, 346, 349, 347, 354, 355; 206/411

[56] References Cited

FOREIGN PATENT DOCUMENTS

| | | |
|---|---|---|
| 2824811 | 12/1978 | Germany . |
| 2909276 | 9/1980 | Germany . |
| 3331016 | 10/1984 | Germany . |
| 4222849 | 6/1993 | Germany . |
| 9211333 | 7/1992 | WIPO . |

*Primary Examiner*—Nasser Ahmad
*Attorney, Agent, or Firm*—Sprung, Horn, Kramer & Woods

[57] ABSTRACT

Use of a strip of an adhesive film for a re-releasable adhesive bond based on thermoplastic elastomer and tackifying resins, the adhesive film having high elasticity and low plasticity and the adhesion being lower than the cohesion, the adhesive strength largely disappearing during extension of the film, the ratio of peel strength to tear strength being at least 1:1.5, and an adhesive bond produced therewith being releasable by pulling on the adhesive film in the direction of the plane of adhesion, one end of the strip being provided on both sides with a UV-opaque covering which at the same time serves as a tab for pulling.

6 Claims, No Drawings

3,491,012

USE OF A STRIP OF AN ADHESIVE FILM FOR A RE-RELEASABLE ADHESIVE BOND

BACKGROUND OF THE INVENTION

The invention relates to the use of a strip for a re-releasable adhesive bond.

German Offenlegungsschrift 33 31 016 discloses adhesive films for re-releasable adhesive bonds which permit an adhesive bond produced therewith to be releasable by pulling on the adhesive film in the direction of the plane of adhesion. Such adhesive films permit high adhesive forces and shear strengths to be obtained and adhesive bonds to be re-released without further aids, comparable to opening a zip fastener or, for even better comparison, to opening a preserving jar: the rubber seal is pulled out of the sealing joint by the tab.

However, serious disadvantages in using such adhesive films have been found in practice. On the one hand the product requires explanation. Someone who has hitherto not used such an adhesive film is readily inclined to adhesively bond the joint parts to one another in such a manner that the adhesive film disappears between the joint parts, no longer projects, and can thus no longer be pulled: this results in an irreversible adhesive bond with corresponding disappointment. However, the disappointment is equally great if, on correct use, the adhesive film tears when pulled: this also results in an irreversible adhesive bond. The advantage of a re-releasable adhesive bond which can be produced in an extremely simple manner without damaging the joint parts just by pulling is transformed into a serious disadvantage, since the joint parts which are to be reseparated are now permanently bonded. Usually the only course that remains is to destroy the joint parts.

The problem of tearing during pulling was also recognised by the inventors of German Offenlegungsschrift 33 31 016, and they paid particular attention to it. Accordingly, on page 4, centre, a specific ratio of pull-off force to tear strength is specified; the tear strength should always be greater than the pull-off force and for safety reasons the ratio of pull-off force to tear strength should be 1:2 to 1:3.

However, it has been found in practice that this precautionary measure is often not sufficient. An adhesive bond of substrates on an open-air exhibition site, which is intended to be reseparated after the end of the exhibition, can, due to tearing, no longer be detached. The same applies to calendars or advent decorations stuck to a window. Posters or pictures, too, similarly fastened to the wall become irreversible wall embellishments as soon as the adhesive film has torn off when pulled. The damage is considerable, the customer lost. The use of even thicker adhesive films as recommended by German Offenlegungsschrift 33 31 016 is also of no help in preventing such tearing.

German Patent 37 14 453 also discloses the use of such an adhesive film, referred to there as strip tape, in order to be able to re-remove practice explosive charges non-destructively from practice objects. A tab 6 is also allowed to project laterally out of the adhesive joint here, so that it can be pulled and the bond thus re-released. In this application, too, tearing often occurs in practice.

SUMMARY OF THE INVENTION

The object of the invention was to provide a remedy for this, in particular to permit the use of strips of adhesive films of this kind without tearing occurring during detachment by pulling.

This object is achieved according to the invention by the parameters characterised in greater detail in the claims.

The use of a UV-opaque covering on one end of the strip successfully avoids the occurrence of tears when the strip is pulled for the purpose of detachment. Whether this occurs by UV light preventing the formation of extremely small, invisible defects of the adhesive film, starting from which, during pulling, a crack can occur and propagate, is left open. In any case, the result is convincing: there are no more tears. Nor was this obvious from the prior art, since particularly according to German Offenlegungsschrift 33 31 016, this problem was approached from a different direction, namely by making the adhesive film thicker. And according to German Patent 37 14 453 absolutely no starting point for solving this problem was evident.

A further advantage of the use according to the invention of a UV-opaque covering at one end of the strip is that this covering can at the same time be used as a tab for pulling. Since a more uniform force transmission over the entire adhesive film width is thereby possible and stress peaks are reduced, the tendency to tear, in particular on rough substrates, is reduced. This also additionally assists the avoidance of cracks during pulling.

It is additionally advantageous that in the region of the tab the adhesive film cannot attain an extremely high adhesive strength with time. Particularly in the case of relatively long adhesive bonds, this strong attachment can become problematic. On the one hand such an adhesive film can be detached from, for example, the wall only with difficulty; on the other hand under tensile stress, as occurs during pulling in the direction of the plane of adhesion, tearing of the adhesive film starting from the edge region and from the adhesive film surface readily occurs, in particular in the case of partial adhesive bonds on rough substrates, for example wood-chip wallpaper. None of these problems occurs with the invention.

DESCRIPTION OF THE PREFERRED EMBODIMENT

The materials used can advantageously be those described in German Offenlegungsschrift 33 31 016, likewise their processing. This ratio of peel force to tear strength of the adhesive film used according to the invention is greater than 1:1.5, but in particular 1:2 or greater. The high elasticity (extensibility) with, at the same time, high tear strength generally also correlates with low plasticity.

The elastomers suitable are in particular those with high tear strength and high extensibility.

Materials which can preferably be used are block copolymers with blocks comprising poly(vinylaromatics) and blocks comprising poly(1,3-dienes) or hydrogenation products thereof. The polyvinylaromatic blocks provide the materials with cohesive properties and thereby substantially control their tear strength. The polydiene blocks or the secondary products obtained from them by hydrogenation provide the materials with their elastic properties. The polyvinylaromatic preferably employed is polystyrene, the elastomer blocks preferably used are poly(butadiene) and poly(isoprene) and the hydrogenation products thereof poly(ethylene/butylene) and poly(ethylene/propylene).

Primarily suitable are triblock copolymers with polystyrene end blocks, abbreviated to S below, and an elastomer centre block, abbreviated to D below, (SDS triblock copolymers). These can contain SD diblock copolymers. Also suitable in principle are also linear (SD)$_n$ block copolymers, radial and star-branched (SD)$_n$X multiblock copolymers, or else mixtures of a plurality of the aforementioned block copolymers.

Suitable tackifiers are the conventional tacky resins such as, for example, hydrocarbon resins, polyterpene resins and terpene/phenolic resins, and colophony and colophony derivatives. Formulation is carried out according to the general rules.

Further mixing components which the adhesive compositions can contain are inter alia:

Plasticiser oils.

Antiageing agents, for example in the form of antioxidants and UV stabilisers.

Fillers. Constituents of the formulation may be inorganic and organic fillers and in particular also pigments.

Crosslinking agents.

Suitable adhesive compositions can be processed from solution, from dispersion or as hot-melt adhesives. Processing from the melt is preferred since this allows thick coatings and simultaneously high coating rates to be achieved.

Suitable equipment comprises standard hot-melt adhesive coating units with, for example, slot die, roller-bar die or single- and twin-screw extruders provided with a suitable die.

In the following examples the invention is described with the aid of exemplary embodiments without thereby restricting it unnecessarily. All parts are parts by weight.

EXAMPLE 1

| 51.5 parts | of linear SIS triblock copolymer with a block polystyrene content of 29% by weight and a Shore A hardness of 60 (Vector 4211) |
|---|---|
| 47.0 parts | of partly hydrogenated aromatic C-9 hydrocarbon resin with a ring and ball softening point of 100° C. with a MMAP value of 58° C. and a DACP value of 16° C. (Regalite S 260) |
| 1.0 part | of phenolic antioxidant (Irganox 1010) and |
| 0.5 part | of light stabiliser (polymeric sterically hindered amine) | are mixed at +160° C. in a sigma-blade mixer until homogeneous. The hot-melt adhesive composition thus obtained is coated at +160° C. with a coating thickness of 410 μm via a slot die onto an 80 μm thick release film of monoaxially stretched polypropylene which is siliconised on both sides.

| adhesive composition thickness | 410 μm |
|---|---|
| tear strength* | 3.9 N/mm$^2$ |
| elongation at break* | 1100% |
| adhesive strength** | approx. 7 N/cm |
| shear resistance*** | >20000 min |

*Stretching rate: 300 mm/min; specimen length: 100 mm
**Steel, peel angle: 90°, peel rate: 300 mm/min, adhesive tape laminated on 25 μm PETP film
***Steel, bond area: 13 × 20 mm$^2$, temperature = room temperature, 20N shear loading.

EXAMPLE 2

| 25.5 parts | of linear SBS triblock polymer with a block polystyrene content of 29% by weight and a Shore A hardness of 65 (Vector 4261) |
|---|---|
| 26.0 parts | of linear SIS triblock polymer with a block polystyrene content of 29% by weight and a Shore A hardness of 60 (Vector 4211) |
| 47.0 parts | of pentaerythritol ester of hydrogenated colophony with a ring and ball softening point of 101° C. and an acid value of 12 (Pentalyn H-E) |
| 1.0 part | of phenolic antioxidant (Irganox 1010) and |
| 0.5 part | of light stabiliser (polymeric sterically hindered amine) | are processed as in Example 1 and spread with a coating thickness of 200 μm onto the release film described in Example 1.

| Adhesive composition thickness | 200 μm |
|---|---|
| Adhesive strength** | 12.0 N/cm |
| Shear resistance*** | >10000 min |

, *see under Example 1

EXAMPLE 3

| 51.5 parts | of linear SIS triblock polymer with a block polystyrene content of 29% by weight and a Shore A hardness of 60 (Vector 4211) |
|---|---|
| 47.0 parts | of pentaerythritol ester of hydrogenated colophony with a ring and ball softening point of 101° C. and an acid value of 12 (Pentalyn H-E) |
| 1.0 part | of phenolic antioxidant (Irganox 1010) and |
| 0.5 part | of light stabiliser (polymeric sterically hindered amine) | are processed as in Example 1 and spread with a coating thickness of 400 μm onto the release film described in Example 1.

| Adhesive composition thickness | 400 μm |
|---|---|
| Adhesive strength** | approx. 25 N/cm |
| Shear resistance*** | >10000 min |
| Elongation at tear* | 1100% |
| Tear strength* | 4.1 N/mm$^2$ |

*, , *see under Example 1

EXAMPLE 4

| 40.0 parts | of linear SEBS triblock polymer with 40% by weight of SEB diblock copolymer, a block polystyrene content of 13% by weight and a Shore A hardness of 65 (Kraton G 1657) |
|---|---|
| 50.0 parts | of pentaerythritol ester of hydrogenated colophony with a ring and ball softening point of 101° C. and an acid value of 14 (Foral 105-E) |
| 10 parts | of an aliphatic oil (V 7047, Shell) |
| 1.0 part | of phenolic antioxidant and |
| 0.5 part | of light stabiliser (polymeric sterically hindered amine) | are processed as in Example 1 and spread with a coating thickness of 200 μm onto the release film described in Example 1.

SEBS-based contact adhesive compositions are suitable in particular if high requirements for the ageing resistance are made.

Production of Sheet Goods (Strips)

Roll goods from Examples 1-4 (comprising double-sided contact adhesive tape with release film covering on one side) are processed on a system comprising 2 laminating stations, one delaminating station, two further laminating stations, one longitudinal cutting device and one separating system (punch to size) to form sheet goods (strips). To this end, a 20 mm wide and 15 μm thick polyethylene terephthalate film is laminated centrally onto the release film-free side (front side) of 120 mm wide roll goods at the first laminating station. At the second laminating station 120 mm wide siliconised polyethylene release film is laminated on in such a manner that the release film projects approximately 2.5 mm over the adhesive composition on both sides. After the release film covering of the reverse side has been removed at a delaminating station, the same coverings (20 mm wide polyethylene terephthalate film in the centre, 125 mm wide siliconised polyethylene film over the entire surface with 2.5 mm projection on both sides) are used for the reverse side. Separation to give sheet goods of 62.5 mm length and 19 mm width is performed by cutting (in the longitudinal direction) and by punching to size.

Typical Dimensions of the Sheet Goods

Adhesive composition

| | |
|---|---|
| Width | 3 mm to 50 mm, preferably 5 mm to 30 mm |
| Length | 15 mm to 200 mm, preferably 25 mm to 80 mm including grip with preferably 8 mm to 25 mm length |
| Thickness | 100 μm to 2000 μm, preferably 200 μm to 1000 μm |

Release Papers//Release Films

Width: see above

Length: is advantageously chosen such that, in addition to the adhesive composition, the tab is partly covered so that the release paper projects over the contact adhesive composition and can thus be easily released therefrom.

Tab

As described, the tab can be formed by covering with a UV-opaque plastic film, for example of polyester, or alternatively for example, by rendering the adhesive composition inert by printing with UV-opaque material.

Paper is also suitable in principle.

Width and length: see above

Thickness: The thickness of the films and papers used should advantageously be chosen such that when the tab region penetrates into the adhesive joint in the contact-adhesive region, as far as possible full-surface adhesion is achieved.

The strips used according to the invention can be made up in particular as sheet goods or roll goods. Sheet goods can be provided, for example, on both sides with readily detachable release laminate, for example with release film or release paper. However, sheet goods can also be covered on one side with release laminate and stacked, the release laminates in this case preferably having a different release strength on each side which is in particular chosen such that, upon detaching a piece of the sheet goods, this is released from the release laminate below it, but the release laminate adheres adequately to the next piece of sheet goods below it.

Roll goods are preferably covered on one side with release film or release paper, with an adhesive-free region (tab) at regular intervals on both sides, and are advantageously perforated at the contact line between the adhesive-free region and the contact-adhesive region in such a manner that sheet goods (strips) can be removed.

We claim:

1. A strip of adhesive film for a releasable adhesive bond consisting of thermoplastic elastomer and tackifying resins of a composition to be self-adhesive, the adhesive film being elastic and non-plastic and the adhesion being lower than the cohesion, the adhesive strength disappearing during extension of the film, the ratio of peel strength to tear strength being at least 1:1.5, and an adhesive bond produced therewith being releasable by pulling on the adhesive film in the direction of the plane of adhesion, the strip having two ends of which one is provided with a UV-opaque covering which at the same time serves as a tab of about 8 to 25 mm in length for pulling, the UV-opaque covering being dimensionally stable and comprising a UV-opaque plastic film laminated both sides of the adhesive film, the strip having adhesive exposed on both surfaces with the pulling tab adjacent one end.

2. A strip of an adhesive film according to claim 1, containing at least one of antioxidants, UV stabilisers, colourants and fillers.

3. A strip of an adhesive film according to claim 1, having a thickness of 0.2 mm to 1.2 mm.

4. A strip of an adhesive film according to claim 1, where the ratio of the peel strength to the tear strength is 1:1.5 to 1:5.

5. A strip of an adhesive film according to claim 1, where raw materials mixture has been kneaded at elevated temperature and extruded.

6. An article releasably adhesively bonded by a strip according to claim 1.

* * * * *

UNITED STATES PATENT AND TRADEMARK OFFICE
CERTIFICATE OF CORRECTION

PATENT NO. : 5,491,012
DATED : February 13, 1996
INVENTOR(S) : Luhmann, et al.

It is certified that error appears in the above-indentified patent and that said Letters Patent is hereby corrected as shown below:

Col. 6, line 37   After " laminated " insert -- on --

Signed and Sealed this

Ninth Day of July, 1996

Attest:

BRUCE LEHMAN

Attesting Officer      Commissioner of Patents and Trademarks